US012511020B2

(12) United States Patent
Nie (10) Patent No.: US 12,511,020 B2
(45) Date of Patent: Dec. 30, 2025

(54) PAGE DISPLAY METHOD AND APPARATUS, COMPUTER DEVICE, AND STORAGE MEDIUM

(71) Applicant: Beijing Zitiao Network Technology Co., Ltd., Beijing (CN)

(72) Inventor: Huijing Nie, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 221 days.

(21) Appl. No.: 18/525,024

(22) Filed: Nov. 30, 2023

(65) Prior Publication Data
US 2024/0211112 A1 Jun. 27, 2024

(30) Foreign Application Priority Data
Dec. 21, 2022 (CN) .......................... 202211648466.3

(51) Int. Cl.
G06F 3/0482 (2013.01)
G06F 3/0483 (2013.01)
(52) U.S. Cl.
CPC .......... G06F 3/0483 (2013.01); G06F 3/0482 (2013.01)
(58) Field of Classification Search
CPC .................................................... G06F 3/0482
USPC .......................................................... 715/277
See application file for complete search history.

(56) References Cited

U.S. PATENT DOCUMENTS

| | | | | | |
|---|---|---|---|---|---|
| 4,437,685 | A * | 3/1984 | Valencia | ................ | B42D 9/001 116/234 |
| 8,018,431 | B1 * | 9/2011 | Zehr | ....................... | G06F 3/016 345/169 |
| 8,413,904 | B1 * | 4/2013 | Zehr | ...................... | G06F 1/1664 400/489 |
| 8,423,889 | B1 * | 4/2013 | Zagorie | ............... | G06F 16/9577 715/255 |
| 8,739,019 | B1 * | 5/2014 | Nevins | .................... | G06F 3/013 715/785 |
| 8,755,058 | B1 * | 6/2014 | Jackson | ................. | G06K 15/00 358/1.13 |
| 9,188,976 | B1 * | 11/2015 | Kim | ........................ | G06Q 90/00 |
| 9,384,672 | B1 * | 7/2016 | Zehr | ................... | H04M 1/0214 |
| RE47,059 | E * | 9/2018 | Nevins | .................. | G06F 40/131 |

(Continued)

FOREIGN PATENT DOCUMENTS

| | | |
|---|---|---|
| CN | 112650429 A | 4/2021 |
| CN | 114817726 A | 7/2022 |

(Continued)

OTHER PUBLICATIONS

First Office Action for Chinese Application No. 202211648466.3, mailed on Dec. 15, 2024, 7 pages.

*Primary Examiner* — Reza Nabi (57) ABSTRACT

The present disclosure provides a page display method and apparatus, a computer device, and a storage medium, wherein the method comprises: responding to a triggering operation on a book collection page; obtaining a target topic corresponding to a collected book in the book collection page, the target topic being a topic determined among a plurality of candidate topics based on at least one target book feature of the collected book, and the plurality of candidate topics being topics associated with the collected book among posted topics of service modules; and displaying the collected book and the target topic in the book collection page.

17 Claims, 4 Drawing Sheets

(56) References Cited

U.S. PATENT DOCUMENTS

| | | | | |
|---|---|---|---|---|
| 2007/0192794 | A1* | 8/2007 | Curtis | G06Q 30/0241 348/E5.103 |
| 2011/0242610 | A1* | 10/2011 | Fan | H04N 1/4074 358/1.15 |
| 2011/0246175 | A1* | 10/2011 | Yi | G06F 40/40 704/3 |
| 2012/0066295 | A1* | 3/2012 | Sambamoorthy | G06Q 10/00 709/203 |
| 2012/0129142 | A1* | 5/2012 | Yoon | G09B 19/06 434/317 |
| 2012/0131427 | A1* | 5/2012 | Artin | G06F 40/166 715/201 |
| 2012/0256408 | A1* | 10/2012 | Malia | B42D 1/004 283/63.1 |
| 2014/0047332 | A1* | 2/2014 | Liu | G06F 40/106 715/273 |
| 2014/0291172 | A1* | 10/2014 | Rogers | A45C 11/00 206/37 |
| 2015/0169503 | A1* | 6/2015 | Maharaj | G06F 3/04817 715/201 |
| 2015/0220227 | A1* | 8/2015 | Landau | G06F 3/0483 715/201 |
| 2015/0227173 | A1* | 8/2015 | Hwang | G06F 1/1652 345/619 |
| 2015/0234786 | A1* | 8/2015 | Landau | G06F 3/0483 715/201 |
| 2015/0317050 | A1* | 11/2015 | Landau | G06F 3/04817 715/738 |
| 2017/0277343 | A1* | 9/2017 | Hotta | G06F 3/0483 |
| 2018/0077442 | A1* | 3/2018 | Herz | H04N 21/41407 |
| 2018/0090034 | A1* | 3/2018 | Hashimoto | G09B 19/00 |
| 2018/0165255 | A1* | 6/2018 | Gafford | G09B 5/06 |
| 2021/0089178 | A1* | 3/2021 | Ge | G06F 3/0484 |
| 2022/0101746 | A1* | 3/2022 | McWilliams | G09B 21/006 |
| 2024/0169157 | A1* | 5/2024 | Nie | G06Q 50/01 |
| 2024/0169450 | A1* | 5/2024 | Nie | G06Q 50/01 |
| 2024/0211112 | A1* | 6/2024 | Nie | G06F 3/0483 |
| 2024/0220084 | A1* | 7/2024 | Nie | G06F 40/166 |
| 2024/0295949 | A1* | 9/2024 | Nie | G06F 3/04842 |
| 2024/0296194 | A1* | 9/2024 | Kushal | G09B 5/02 |
| 2025/0061157 | A1* | 2/2025 | Tan | G06F 16/9535 |
| 2025/0103635 | A1* | 3/2025 | Li | G06F 16/338 |

FOREIGN PATENT DOCUMENTS

| | | | | |
|---|---|---|---|---|
| CN | 114860919 | A * | 8/2022 | G06F 18/24 |
| CN | 115328361 | A * | 11/2022 | G06F 3/0487 |
| WO | 2022135074 | A1 | 6/2022 | |

\* cited by examiner

PAGE DISPLAY METHOD AND APPARATUS, COMPUTER DEVICE, AND STORAGE MEDIUM

CROSS-REFERENCE TO RELATED APPLICATIONS

The present application is based on and claims priority to Chinese Patent Application No. 202211648466.3 filed on Dec. 21, 2022, and entitled "PAGE DISPLAY METHOD AND APPARATUS, COMPUTER DEVICE, AND STORAGE MEDIUM", the disclosure of which is incorporated by reference herein in its entirety.

TECHNICAL FIELD

The present disclosure relates to the field of computer technology, and in particular, to a page display method and apparatus, a computer device, and a storage medium.

BACKGROUND

With the development of computer technology, novel online reading applications have more and more functions. For example, a user can collect read books, so that the read books can be quickly positioned in a book collection page. However, the book collection function of the existing applications allows only viewing the read books, so that when the user wants to view topic content associated with the read books, he needs to exit the current book collection page and enter a topic content page for viewing, which increases search paths of the user, and influences the use experience of the user.

SUMMARY

Embodiments of the present disclosure at least provide a page display method and apparatus, a computer device, and a storage medium.

In a first aspect, an embodiment of the present disclosure provides a page display method, comprising: responding to a triggering operation on a book collection page; obtaining a target topic corresponding to a collected book in the book collection page, the target topic being a topic determined among a plurality of candidate topics based on at least one target book feature of the collected book, and the plurality of candidate topics being topics associated with the collected book among posted topics of service modules; and displaying the collected book and the target topic in the book collection page.

In an optional implementation, the target book feature comprises a feature in at least one of: a book updating state dimension, a basic attribute dimension, a book type dimension, a book plot dimension, a book reading information dimension, or a book association event dimension.

In an optional implementation, the target topic belongs to at least one first topic circle; and the displaying the target topic in the book collection page comprises: displaying, in an identification area of the book collection page, a first jump identification for at least part of the first topic circle, the first jump identification being an identification for jumping to a first aggregation page corresponding to the first topic circle, and the first aggregation page comprising a target topic associated with the first topic circle; and displaying, in a first topic area of the book collection page, topic content of the target topic, the identification area and the first topic area being different display areas.

In an optional implementation, the topic content comprises a topic classification label, and the displaying, in the first topic area of the book collection page, the topic content of the target topic comprises: obtaining a first topic classification label matched with the target topic; and displaying the first topic classification label in a label display area of the first topic area; and the method further comprises: in response to a triggering operation on the first topic classification label, obtaining a target topic corresponding to the first topic classification label; and jumping to a second aggregation page, and displaying, in the second aggregation page, the target topic corresponding to the first topic classification label.

In an optional implementation, the displaying the target topic in the book collection page comprises: obtaining at least one second topic classification label, each the second topic classification label corresponding to at least one topic group, and each the topic group comprising at least one target topic; displaying, in a first label area of the book collection page, the at least one second topic classification label, and displaying, in a second label area of the book collection page, a second topic circle corresponding to at least part of the second topic classification label; and in response to a triggering operation on the second topic circle, jumping to display a third aggregation page, and displaying, in the third aggregation page, at least one target topic comprised in the second topic circle.

In an optional implementation, the displaying, in the second label area of the book collection page, the second topic circle corresponding to at least part of the second topic classification label comprises: in response to a triggering operation on the second topic classification label, obtaining at least one sub-classification label comprised in the second topic classification label, and displaying the at least one sub-classification label, each the sub-classification label corresponding to at least one second topic circle; and in response to a triggering operation on a target sub-classification label among the at least one sub-classification label, obtaining a second topic circle corresponding to the target sub-classification label, and displaying, in the second label area, the second topic circle corresponding to the target sub-classification label.

In an optional implementation, the target topic is determined by: obtaining at least one book classification label of the collected book; determining a preset topic label matched with the at least one book classification label among a plurality of preset topic labels, each the preset topic label comprising a plurality of first candidate topics; and determining the target topic matched with the at least one target book feature of the collected book based on the plurality of first candidate topics to which the matched preset topic label belongs.

In an optional implementation, the target topic is determined by: obtaining a plurality of second candidate topics in a topic circle to which the collected book belongs; determining a second candidate topic matched with at least part of the target book feature among the plurality of second candidate topics; and determining the target topic based on the matched second candidate topic.

In a second aspect, an embodiment of the present disclosure further provides a page display apparatus, comprising: a responding unit configured to respond to a triggering operation on a book collection page; an obtaining unit configured to obtain a target topic corresponding to a collected book in the book collection page, the target topic being a topic determined among a plurality of candidate topics based on at least one target book feature of the collected book, and the plurality of candidate topics being topics associated with the collected book among posted topics of service modules; and a display unit configured to display the collected book and the target topic in the book collection page.

In a third aspect, an embodiment of the present disclosure further provides a computer device, comprising: a processor, a memory, and a bus, the memory having thereon stored machine-readable instructions executable by the processor, the processor communicating with the memory through the bus when the computer device operates, and the machine-readable instructions, when executed by the processor, performing the steps in the above first aspect or any of the possible implementations in the first aspect.

In a fourth aspect, an embodiment of the present disclosure further provides a non-transitory computer-readable storage medium having thereon stored a computer program which, when executed by a processor, performs the steps in the above first aspect or any of the possible implementations in the first aspect.

In the embodiment of the present disclosure, first, a triggering operation on a book collection page is detected, and then, in response to the triggering operation, a target topic corresponding to a collected book in the book collection page is obtained, the target topic being a topic determined among a plurality of candidate topics based on at least one target book feature of the collected book, and the plurality of candidate topics being topics associated with the collected book among posted topics of service modules; and then, the collected book and the target topic can be displayed in the book collection page.

In order to make the above objectives, features and advantages of the present disclosure more apparent and comprehensible, a detailed description is made below by providing preferred embodiments and combining the accompanying drawings.

BRIEF DESCRIPTION OF THE DRAWINGS

In order to more clearly describe the technical solutions of the embodiments of the present disclosure, the drawings that need to be used in the embodiments will be briefly described below, the drawings herein are incorporated in and form part of this specification, and the drawings illustrate embodiments consistent with the present disclosure and, together with the description, serve to explain the technical solutions of the present disclosure. It should be understood that the following drawings illustrate only certain embodiments of the present disclosure and therefore should not be regarded as limiting the scope, and for those of ordinary skill in the art, other related drawings may also be obtained according to these drawings without paying out any creative effort.

DETAILED DESCRIPTION

To make the objectives, technical solutions and advantages of the embodiments of the present disclosure more apparent, the technical solutions in the embodiments of the present disclosure will be described clearly and completely below in conjunction with the drawings in the embodiments of the present disclosure, and it is obvious that the described embodiments are only some of the embodiments of the present disclosure, rather than all of the embodiments. Components of the embodiments of the present disclosure, which are generally described and illustrated in the accompanying drawings herein, could be arranged and designed in a wide variety of different configurations. Therefore, the following detailed description of the embodiments of the present disclosure that are provided in the accompanying drawings is not intended to limit the claimed scope of the present disclosure, but merely represents selected embodiments of the present disclosure. All other embodiments, which are obtained by those skilled in the art based on the embodiments of the present disclosure without making creative labor, shall fall within the scope of protection of the present disclosure.

It should be noted that: similar reference numbers and letters refer to similar items in the following drawings, and therefore, once an item is defined in one drawing, it does not need to be further defined or explained in subsequent drawings.

The term "and/or" herein, which merely describes an association relationship, indicates that there can be three relationships, for example, A and/or B can indicate three cases of: A existing alone, A and B coexisting, and B existing alone. In addition, the term "at least one" herein indicates any one of a plurality or any combination of at least two of a plurality, for example, "including at least one of A, B, or C" can represent "including any one or more selected from a set formed by A, B and C".

It can be understood that, before the technical solutions disclosed in the embodiments of the present disclosure are used, a user should be informed of a type, usage scope, usage scene, etc. of personal information involved in the present disclosure in a proper manner according to related laws and regulations, and authorization from the user should be obtained.

It was found by study that, with the development of computer technology, novel online reading applications have more and more functions. For example, a user can collect read books, so that the read books can be quickly positioned in a book collection page. However, the book collection function of the existing applications allows only viewing the read books, so that when the user wants to view topic content associated with the read books, he needs to exit the current book collection page and enter a topic content page for viewing, which increases search paths of the user, and influences the use experience of the user.

Based on the above research, the present disclosure provides a page display method and apparatus, a computer device, and a storage medium. In an embodiment of the present disclosure, first, a triggering operation on a book collection page is detected, and then, in response to the triggering operation, a target topic corresponding to a collected book in the book collection page is obtained, the target topic being a topic determined among a plurality of candidate topics based on at least one target book feature of the collected book, and the plurality of candidate topics being topics associated with the collected book among posted topics of service modules; and then, the collected book and the target topic can be displayed in the book collection page.

In the above implementation, by displaying the collected book and the target topic corresponding to the collected book in the book collection page, more content associated with the collected book can be displayed for the user in the book collection page, and thus the display content of the book collection page is enriched. Meanwhile, an association between a service module corresponding to the book collection page and a topic service module can be enhanced. By displaying the target topic in the book collection page, the user can enter the corresponding topic content page through the book collection page, so that the search path for searching related topic content by the user can be shortened, the search efficiency of the user is improved, and thereby the search experience of the user is improved.

To facilitate understanding of this embodiment, a page display method disclosed in an embodiment of the present disclosure is first described in detail, which can be applied in a novel reading application, and in this case, an execution subject of the page display method provided in the embodiment of the present disclosure is generally a computer device with a certain computing capability.

Figure 1:
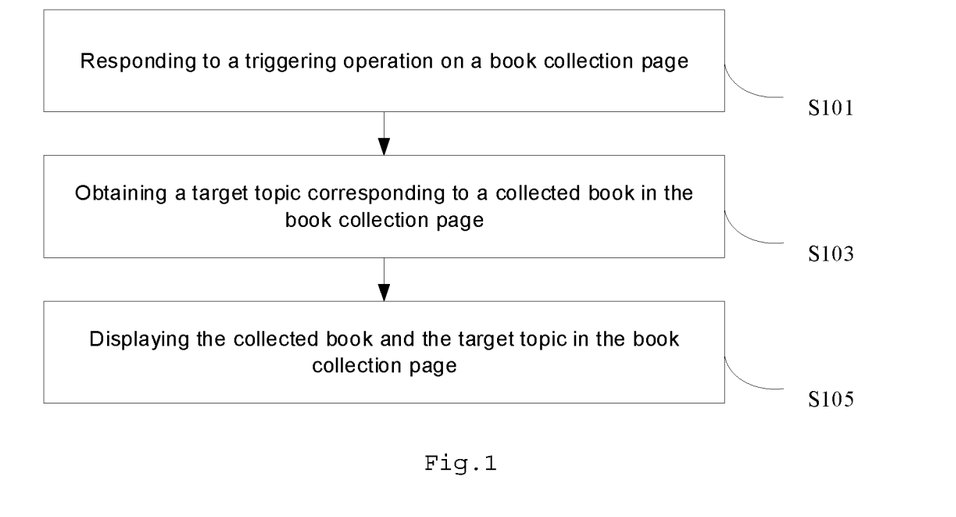
FIG. 1 illustrates a flow diagram of a page display method according to an embodiment of the present disclosure.

Reference is made to FIG. 1, which is a flow diagram of a page display method according to an embodiment of the present disclosure, the method comprising steps S101 to S105, where:

S101: responding to a triggering operation on a book collection page.

In the embodiment of the present disclosure, the book collection page may correspond to a related service module in a novel reading application, for example, a module name of the service module may be "bookshelf module", that is, a user may collect a corresponding book through the service module, and the collected book is displayed through the book collection page.

In this case, a corresponding triggering identification may be set for the "bookshelf module" in a novel client. After a triggering operation for the triggering identification is detected, the following steps in S103 to S105 are performed to display detailed content of the book collection page.

S103: obtaining a target topic corresponding to a collected book in the book collection page.

In the embodiment of the present disclosure, the collected book may be understood as an e-book on which a user performs a book collection operation in advance.

For example, after a user reads an interested e-book from a novel reading application, he can collect the e-book, so that the user can conveniently quickly find the previously interested e-book after he enters the application next time.

In the embodiment of the present disclosure, the target topic is a topic determined among a plurality of candidate topics based on at least one target book feature of the collected book, the plurality of candidate topics being topics associated with the collected book among posted topics of service modules.

The service module may be understood as a functional module included in the novel reading application, for example, the service module may be a topic square module, or a book circle module, etc. The module names, module content, and module quantities of the above service modules are not specifically limited in the present disclosure, but rather the posted topics can be included.

In the embodiment of the present disclosure, the plurality of candidate topics are topics associated with the collected book, for example, the plurality of candidate topics may be a topic of recommending the collected book, or a topic of recommending a book associated with the collected book, or a topic of discussing chapter content in the collected book, or a topic of discussing a character in the collected book, or the like.

In the embodiment of the present disclosure, the target book feature may be understood as a feature associated with a target book, where the number of the target book feature may be one or more.

In an optional implementation, the target book feature may comprise a feature in at least one of: a book updating state dimension, a basic attribute dimension, a book type dimension, a book plot dimension, a book reading information dimension, or a book association event dimension.

The book updating state dimension may indicate an updating state of the collected book, for example, the updating state may be any of: updating, finished. Based on this, in the book updating state dimension, two sub-features may be included, namely, updating and finished, respectively. In the case where the updating state is updating, the updating state may further indicate a chapter number and a chapter title of a latest updated chapter of the collected book, for example, it may indicate that the collected book is updated to chapter 100.

In the basic attribute dimension, at least one of the following features can be included: an author name of the collected book, a character name of the collected book, rating information of the collected book, or the like.

The book type dimension may indicate a book type of the collected book. Based on this, in the book type dimension, a plurality of sub-features may be included, for example, the number of the sub-features may be 2, where a first sub-feature may indicate a theme type of the collected book, for example, the theme type may be a science fiction type, or an ancient romantic type, or the like. A second sub-feature may indicate a character type of the collected book, for example, the character type may be a power woman type, or a star type, or the like.

The book plot dimension may indicate a book content type of the collected book, and in this case, a feature in the book plot dimension may indicate a farming type, or an e-sports type, or an apocalypse type, or the like.

The book reading information dimension may indicate a read chapter of the collected book, for example, in the case where the collected book has been read to chapter 100, a feature in the book reading information dimension may indicate that the read chapter of the collected book is from chapter 1 to the chapter 100.

The book association event dimension may indicate an event associated with the collected book, and in this case, a feature in the book association event dimension may indicate an event type of an event associated with the collected book. For example, the event type may be a posting topic type, or a posting new book type, or a posting announcement type, or the like.

Based on this, the target book feature of the collected book may be: updating, a character name "XXX" of the collected book, a science fiction type, an apocalypse type, and the like.

In the embodiment of the present disclosure, after the at least one target book feature corresponding to the collected book is determined, a topic matched with the target book features may be determined among the plurality of candidate topics, and the matched topic is determined as the target topic.

In the embodiment of the present disclosure, after the target topics are determined, the determined target topics may further be ranked. For example, the topics may be ranked according to topic heat of the target topic, or ranked according to the number of likes of the target topic, or ranked according to a post time of the target topic.

In the embodiment of the present disclosure, in obtaining the target topic corresponding to the collected book in the book collection page, the target topics corresponding to all the collected books in the book collection page may be obtained, or the target topics corresponding to part of the collected books in the book collection page may be obtained. For example, in the case of a large number of collected books included in the book collection page, a collected book meeting an obtaining requirement may be screened from the plurality of collected books based on a preset book screening feature, and a target topic of the collected book meeting the obtaining requirement is obtained. The obtaining requirement indicates at least one of: collection time, reading progress, reading frequency, or the like.

S105: displaying the collected book and the target topic in the book collection page.

In the embodiment of the present disclosure, the book collection page may include a plurality of subpages, where different page content may be displayed. For example, the book collection page may include 2 subpages, where subpage 1 may display a collected book, and subpage 2 may display a target topic. Or, the book collection page may further include a third subpage, where a book browsing history is displayed, wherein the number of subpages included in the book collection page and the page content displayed in each subpage are not specifically limited in the present disclosure.

In the embodiment of the present disclosure, in the case where the book collection page includes a plurality of subpages, each subpage may correspond to one page identification. In this case, in response to a triggering operation for the page identification, corresponding page content may be displayed in the subpage of the book collection page. For example, if the page identification is "collected book", then, after a triggering operation for the page identification "collected book" is detected, subpage corresponding to the collected book is displayed in the book collection page, and the collected book is displayed in the corresponding subpage.

Figure 2:
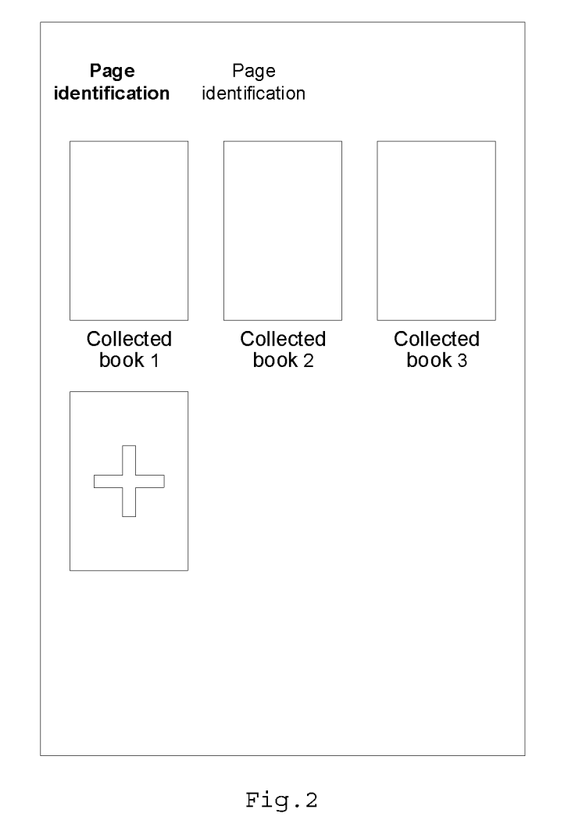
FIG. 2 illustrates a schematic diagram of displaying a collected book in a book collection page according to an embodiment of the present disclosure.
Figure 3:
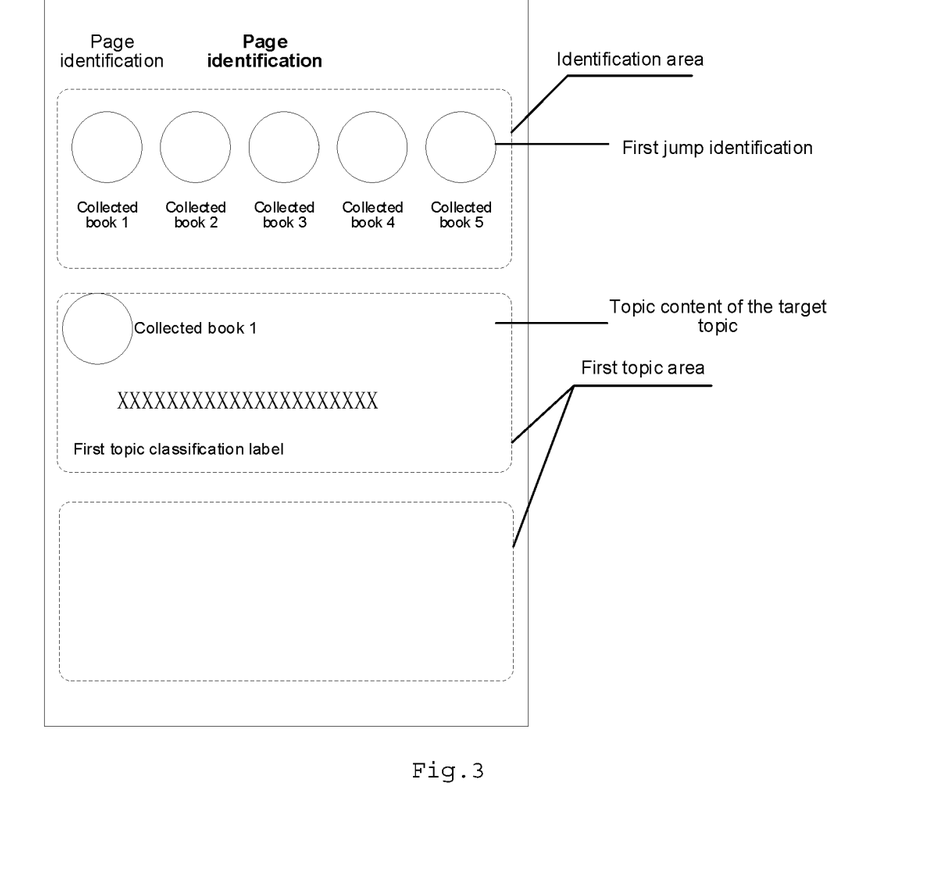
FIG. 3 illustrates a schematic diagram of displaying a target topic in a book collection page according to an embodiment of the present disclosure.

Exemplarily, it is assumed that collected books can be displayed in a book collection page. Then, the book collection page can display the collected books in subpage 1 as shown in FIG. 2, and in this case, the collected books may be a collected book 1, a collected book 2, and a collected book 3. Assuming that a target topic can be displayed in a book collection page, the book collection page can display the target topic in a subpage as shown in FIG. 3.

In the embodiment of the present disclosure, it is possible to respond to a triggering operation on the book collection page, to obtain the target topic corresponding to the collected book in the book collection page. Then, the collected book and the target topic can be displayed in the book collection page.

In the embodiment of the present disclosure, first, a triggering operation on a book collection page is detected, and then, in response to the triggering operation, a target topic corresponding to a collected book in the book collection page is obtained, the target topic being a topic determined among a plurality of candidate topics based on at least one target book feature of the collected book, and the plurality of candidate topics being topics associated with the collected book among posted topics of service modules; and then, the collected book and the target topic can be displayed in the book collection page.

In the above implementation, by displaying the collected book and the target topic corresponding to the collected book in the book collection page, more content associated with the collected book can be displayed for the user in the book collection page, and thus the display content of the book collection page is enriched. Meanwhile, an association between a service module corresponding to the book collection page and a topic service module can be enhanced. By displaying the target topic in the book collection page, the user can enter the corresponding topic content page through the book collection page, so that the search path for searching related topic content by the user can be shortened, the search efficiency of the user is improved, and thereby the search experience of the user is improved.

In an optional implementation, in the case of a plurality of collected books in the book collection page, a topic associated with each collected book among the posted topics of the service modules may be determined as a first topic, and in this case, the first topic corresponding to the each collected book may be gathered to obtain a first topic circle corresponding to the each collected book. In this case, the first topic can be understood as the above candidate topic.

In another optional implementation, in the case of a plurality of collected books in the book collection page, a topic corresponding to the at least one target book feature of the each collected book that is determined among the plurality of candidate topics may be determined as a first topic, and then the first topic of each collected book may be gathered to obtain a first topic circle corresponding to the each collected book.

Based on this, in the case where it is determined that the target topic corresponding to the collected book belongs to at least one first topic circle, for the S105: displaying the target topic in the book collection page, it specifically comprises the following steps:

step S11: displaying, in an identification area of the book collection page, a first jump identification for at least part of the first topic circle, the first jump identification being an identification for jumping to a first aggregation page corresponding to the first topic circle, and the first aggregation page comprising a target topic associated with the first topic circle;

step S12: displaying, in a first topic area of the book collection page, topic content of the target topic, the identification area and the first topic area being different display areas.

In the embodiment of the present disclosure, the first jump identification for the first topic circle may indicate the collected book corresponding to the first topic circle. Based on this, include: image the first jump identification may identification information, and/or text identification information. For example, the image identification information may be a cover image of the collected book, and the text identification information may be a book name of the collected book.

In the embodiment of the present disclosure, the identification area of the book collection page may be located in a top area of the book collection page, or in a side area of the book collection page, wherein the position of the identification area in the book collection page is not specifically limited in the present disclosure.

In the embodiment of the present disclosure, all the first jump identifications for the first topic circles may be displayed in the identification area, or a first jump identification meeting a display requirement may be displayed in the identification area. The above display requirement may include requirements in at least the following dimensions: heat of topic, topic updating time, reading history, etc. Based on this, the display requirement may be at least one of: the heat of topic being ranked top three, the topic updating time being within three months, the reading history being within one month, or the like.

For example, if the above display requirement is the reading history being within one month, then reading history records of reading the collected book within one month from the current time in the book collection page may be determined. It is assumed that 5 collected books read within one month are determined, which are: a collected book 1, a collected book 2, a collected book 3, a collected book 4, and a collected book 5, respectively. Then, as shown in FIG. 3 which is a schematic diagram of a book collection page, first jump identifications for first topic circles corresponding to the 5 collected books described above may be displayed in an identification area of the book collection page shown in FIG. 3.

In the embodiment of the present disclosure, in response to a triggering operation on the first jumping identification, jumping to a first aggregation page for the first topic circle may be performed, and in this case, a target topic associated with the first topic circle may be displayed in the first aggregation page.

In the embodiment of the present disclosure, a plurality of target topics associated with the first topic circle may be displayed in the first aggregation page, and in this case, the above target topics associated with the first topic circle may be ranked according to a preset ranking feature, and the ranked target topics are displayed in the first aggregation page. The preset ranking feature may indicate at least one of: topic updating time, a total number of topic words, heat of topic, or the like.

In the embodiment of the present disclosure, as shown in FIG. 3, the book collection page may further include a first topic area, and topic content of the target topic is displayed in the first topic area. The first topic area can include at least one subarea, and the topic content of each target topic is displayed in the corresponding subarea.

In an optional implementation, as shown in FIG. 3, a first jump identification for a first topic circle to which the target topic belongs may also be displayed in the first topic area. After a triggering operation for the first jump identification in the first topic area is detected, jumping to the first aggregation page corresponding to the first topic circle may be performed.

It should be noted herein that, in the book collection page, in addition to the target topic corresponding to the collected book, other topics corresponding to books other than the collected book may also be displayed.

Based on this, in the first topic area in the book collection page, display area of another topic may be also included in addition to display area of the target topic, and topic content of the another topic is displayed in the display area of the another topic. In this case, a jump identification for a topic circle to which the another topic belongs can also be displayed in the display area of the another topic.

In the above implementation, it is possible to display the first jump identification in the identification area in the book collection page, and display the topic content of the target topic in the first topic area, which not only displays the topic content of the target topic for the user, but also provides, for the user, a convenient path of jumping into the first aggregation page for the first topic circle by means of the first jump identification, so that the user can browse more related topics of the collected books corresponding to the first topic circle, and therefore the browsing requirement of the user can be better met, and the use experience of the user is improved.

In an optional implementation, for the above step S12: displaying, in the first topic area of the book collection page, the topic content of the target topic, it specifically comprises the following steps:

step S21: obtaining a first topic classification label matched with the target topic; and step S22: displaying the first topic classification label in a label display area of the first topic area.

The first topic classification label may be determined based on a label of the collected book itself, and in this case, the first topic classification label may indicate related content of the collected book, for example, the first topic classification label may indicate a book type of the collected book, book content of the collected book, a book attribute (e.g., a book author, a book name, a book character, etc.) of the collected book.

Or, the first topic classification label may be determined based on the topic content of the target topic (or another topic associated with the target topic), for example, the first topic classification label may indicate a type (e.g., the type may be an impression after reading, a question, a discussion, a second creation, etc.) of the topic content, or key information (e.g., a character name, plot content, etc.) of the topic content.

In the embodiment of the present disclosure, as shown in FIG. 3, it is possible to display the topic content of the target topic in the first topic area in the book collection page, and display the first topic classification label in the label display area of the first topic area.

In this case, in response to a triggering operation on the first topic classification label, it is possible to obtain a target topic corresponding to the first topic classification label and jump to a second aggregation page. In this case, the target topic corresponding to the first topic classification label may be displayed in the second aggregation page.

In this case, it is possible to display label content of the first topic classification label and display the topic content of the target topic corresponding to the first topic classification label, in the second aggregation page.

The topic content of the target topic displayed in the second aggregation page may further include the topic classification label matched with the target topic.

In the embodiment of the present disclosure, a plurality of target topics may be displayed in the second aggregation page, and in this case, a display order of the plurality of target topics may be determined based on topic heat of the target topics and/or a topic updating time of the target topics.

In the above implementation, the first topic classification label matched with the target topic can be obtained, and the first topic classification label is displayed in the label display area of the first topic area, thereby enabling the user to simply and intuitively know the topic content corresponding to the target topic while not unfolding the topic content of the target topic for viewing. Then, in response to a triggering operation on the first topic classification label, a target topic corresponding to the first topic classification label can be obtained. Then, jumping to the second aggregation page can be performed, and the target topic corresponding to the first topic classification label is displayed in the second aggregation page, so that a search path for searching the target topic corresponding to the first topic classification label by the user can be simplified, and richer target topics of interest are provided for the user by the first topic classification label.

In an optional implementation, for the S105: displaying the target topic in the book collection page, it specifically comprises the following steps:

step S31: obtaining at least one second topic classification label, each the second topic classification label corresponding to at least one topic group, and each the topic group comprising at least one target topic;

step S32: displaying, in a first label area of the book collection page, the at least one second topic classification label, and displaying, in a second label area of the book collection page, a second topic circle corresponding to at least part of the second topic classification label; and step S33: in response to a triggering operation on the second topic circle, jumping to display a third aggregation page, and displaying, in the third aggregation page, at least one target topic comprised in the second topic circle.

In the embodiment of the present disclosure, the second topic classification label may indicate a book type corresponding to the collected book in the book collection page, for example, the second topic classification label may be a "Harem fighting/House fighting", or an "Urban imaginative", or the like.

In the embodiment of the present disclosure, the second topic classification label may be a preset type label, and the collected book in the collected book page is classified based on the preset type label. Or, the second topic classification label may be determined based on the book type of the collected book, and in this case, the number of the second topic classification label is associated with the number of the book type to which the collected book belongs in the book collection page.

Figure 4:
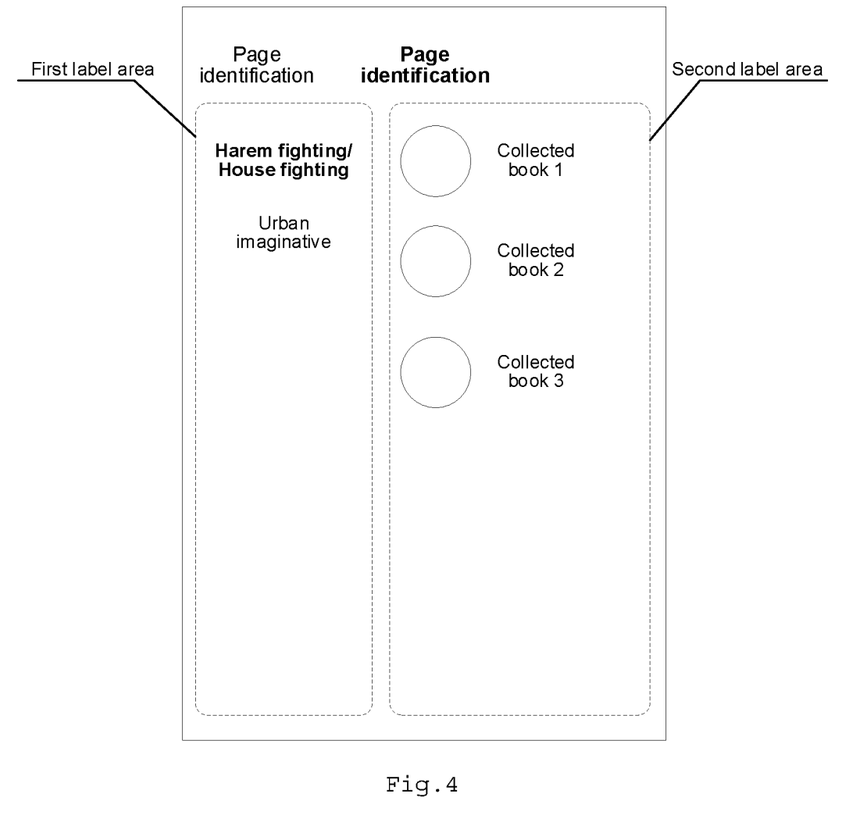
FIG. 4 illustrates another schematic diagram of displaying a target topic in a book collection page according to an embodiment of the present disclosure.

In the embodiment of the present disclosure, after the at least one second topic classification label is obtained, the at least one second topic classification label may be displayed in the first label area of the book collection page. For example, as shown in FIG. 4 which is another schematic diagram of displaying a target topic on a book collection page, in this case, the above second topic classification label: "Harem fighting/House fighting", or an "Urban imaginative", may be displayed in the first label area in the book collection page shown in FIG. 4.

In the embodiment of the present disclosure, in the case where the book type indicated by the second topic classification label corresponds to a plurality of collected books, the second topic label may correspond to a plurality of second topic circles, wherein each second topic circle may correspond to one collected book, and in this case, the second topic circle may include a target topic corresponding to the collected book.

Assuming that there are 3 collected books corresponding to the second topic classification label "Harem fighting/House fighting", which are the collected book 1, the collected book 2, and the collected book 3, respectively, then there are also 3 second topic circles corresponding to the second topic classification label "Harem fighting/House fighting", which may be: a topic circle for the collected book 1, a topic circle for the collected book 2, and a topic circle for the collected book 3. Then, the 3 second topic circles corresponding to the second topic classification label "Harem fighting/House fighting" can be displayed in the second label area, that is, the "collected book 1", "collected book 2", and "collected book 3" displayed in the second label area in FIG. 4.

In the embodiment of the present disclosure, after a triggering operation for the second topic circle is detected, it is possible to jump to a third aggregation page and display the topic comprised in the second topic circle.

In another optional implementation, the second topic classification label may indicate book types of all books included in the service modules, and in this case, each second topic classification label may correspond to a plurality of second topic circles, and each second topic circle may correspond to one book, and in this case, a topic associated with the book is included in the second topic circle.

In the above implementation, the second topic circle corresponding to the collected book can be classified by the second topic classification label, so that the search path for finding the topic associated with the collected book can be shortened, and the search time is saved.

In an optional implementation, for the above step S32: displaying, in the second label area of the book collection page, the second topic circle corresponding to at least part of second topic classification label, it specifically comprises the following steps:

step S41: in response to a triggering operation on the second topic classification label, obtaining at least one sub-classification label comprised in the second topic classification label, and displaying the at least one sub-classification label, each the sub-classification label corresponding to at least one second topic circle; and step S42: in response to a triggering operation on a target sub-classification label among the at least one sub-classification label, obtaining a second topic circle corresponding to the target sub-classification label, and displaying, in the second label area, the second topic circle corresponding to the target sub-classification label.

In the embodiment of the present disclosure, the sub-classification label may be understood as a label determined based on book content of the collected book (or all the books), for example, in the case where the second topic classification label is the above "Harem fighting/House fighting", the sub-classification label can be "Power woman", "Princess", "Scheming", or the like.

Each sub-classification label may correspond to at least one second topic circle, and the second topic circle corresponding to each sub-classification label may be the same or different. In this case, the second topic circle may correspond to one sub-classification label or a plurality of sub-classification labels. For example, there are 3 second topic circles, which are: the topic circle for the collected book 1, the topic circle for the collected book 2, and the topic circle for the collected book 3, described above, respectively, then the sub-classification label 1 may include the topic circle for the collected book 1 and the topic circle for the collected book 2, and the sub-classification label 2 may include the topic circle for the collected book 1 and the topic circle for the collected book 3.

In the embodiment of the present disclosure, after a triggering operation for the second topic classification label is detected, at least one sub-classification label comprised in the second topic classification label may be obtained and displayed. Then, in response to a triggering operation for a target sub-classification label among the at least one sub-classification label, a second topic circle corresponding to the target sub-classification label may be obtained. Then, the second topic circle corresponding to the target sub-classification label can be displayed in the second label area.

In the above implementation, by means of the at least one sub-classification label comprised in the second topic classification label, a more detailed division of the second topic classification label can be achieved, so that the user can be better assisted in selecting an interested topic circle.

In an optional implementation, in the embodiment of the present disclosure, the target topic may be determined in the following manner.

First, at least one book classification label of the collected book is obtained.

The book classification label can indicate basic attribute information of the collected book, or book content of the collected book. For example, the book classification label may indicate an author of the collected book, a character of the collected book, a name of the collected book, a plot of the collected book, a storyline of the collected book, and the like.

Then, a preset topic label matched with the at least one book classification label is determined among a plurality of preset topic labels, each the preset topic labels comprising a plurality of first candidate topics.

Here, the plurality of preset topic labels may be understood as the topic labels included in the service modules, for example, the plurality of preset topic labels may be labels corresponding to topics in a book famine square, or book classification labels included in a book classification module.

Each the preset topic label may comprise a plurality of first candidate topics, and each first candidate topic may also correspond to a plurality of preset topic labels.

In the embodiment of the present disclosure, a preset topic label matched with the at least one book classification label may be determined among the plurality of preset topic labels. when specifically implemented, a label that is identical or similar (i.e., semantically identical) to the book classification label, among the plurality of preset topic label, may be determined as the matched preset topic label.

Then, the target topic matched with the at least one target book feature of the collected book is determined based on the plurality of first candidate topics to which the matched preset topic label belongs.

When specifically implemented, theme information of each first candidate topic may be determined, and then the theme information may be matched with the at least one target book feature of the collected book, to obtain a plurality of pieces of theme information matched with the at least one target book feature of the collected book, and a first candidate topic corresponding to the matched theme information is determined as the target topic.

In the above implementation, it is possible to determine the preset topic label matched with the book classification label of the collected book, and determine the target topic matched with the at least one target book feature of the collected book from the plurality of first candidate topics to which the matched preset topic label belongs, and therefore the determination range of the target topic can be expanded, such that the determined target topic is more comprehensive.

In another optional implementation, the target topic may also be determined based on the topics in the topic circle corresponding to the collected book. Based on this, in the embodiment of the present disclosure, the above target topic may also be determined in the following manner.

First, a plurality of second candidate topics in the topic circle to which the collected book belongs are obtained.

Next, a second candidate topic matched with at least part of the target book feature is determined among the plurality of second candidate topics.

Then, the target topic is determined based on the matched second candidate topic.

In the above implementation, the second candidate topics in the topic circle to which the collected book belong can be screened through the target book feature to obtain the target topic, thereby obtaining the topic which better meets the requirements of the user, and then improving the quality of the obtained target topic.

It can be understood by those skilled in the art that in the above method of the specific implementation, the writing order of the steps does not mean a strict execution order so that any limitation is imposed on the implementation process, and the specific execution order of the steps should be determined by their functions and possibly inherent logic.

Based on the same inventive concept, an embodiment of the present disclosure further provides a page display apparatus corresponding to the page display method, and since the principle of solving the problem by the apparatus in the embodiment of the present disclosure is similar to that of the above page display method in the embodiment of the present disclosure, for the implementation of the apparatus, reference may be made to the implementation of the method, so that repetitions are not given again.

Figure 5:
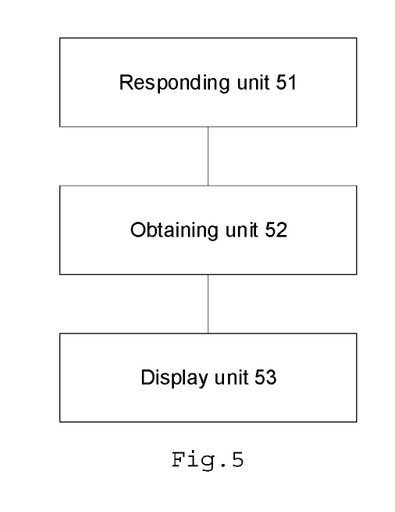
FIG. 5 illustrates a schematic diagram of a page display apparatus according to an embodiment of the present disclosure.

Reference is made to FIG. 5, which is a schematic diagram of a page display apparatus according to an embodiment of the present disclosure, comprising: a responding unit 51, an obtaining unit 52, and a display unit 53, wherein
the responding unit 51 is configured to respond to a triggering operation on a book collection page;
the obtaining unit 52 is configured to obtain a target topic corresponding to a collected book in the book collection page, the target topic being a topic determined among a plurality of candidate topics based on at least one target book feature of the collected book, and the plurality of candidate topics being topics associated with the collected book among posted topics of service modules; and
the display unit 53 is configured to display the collected book and the target topic in the book collection page.

In the embodiment of the present disclosure, first, a triggering operation on a book collection page is detected, and then, in response to the triggering operation, a target topic corresponding to a collected book in the book collection page is obtained, the target topic being a topic determined among a plurality of candidate topics based on at least one target book feature of the collected book, and the plurality of candidate topics being topics associated with the collected book among posted topics of service modules; and then, the collected book and the target topic can be displayed in the book collection page.

In the above implementation, by displaying the collected book and the target topic corresponding to the collected book in the book collection page, more content associated with the collected book can be displayed for the user in the book collection page, and thus the display content of the book collection page is enriched. Meanwhile, an association between a service module corresponding to the book collection page and a topic service module can be enhanced. By displaying the target topic in the book collection page, the user can enter the corresponding topic content page through the book collection page, so that the search path for searching related topic content by the user can be shortened, the search efficiency of the user is improved, and then the search experience of the user is improved.

In a possible implementation, the target book feature comprises a feature in at least one of: a book updating state dimension, a basic attribute dimension, a book type dimension, a book plot dimension, a book reading information dimension, or a book association event dimension.

In a possible implementation, the display unit 53 is further configured to: in the case where the target topic belongs to at least one first topic circle, display, in an identification area of the book collection page, a first jump identification for at least part of the first topic circle, the first jump identification being an identification used for jumping to a first aggregation page corresponding to the first topic circle, and the first aggregation page comprising a target topic associated with the first topic circle; and display, in a first topic area of the book collection page, topic content of the target topic, the identification area and the first topic area being different display areas.

In a possible implementation, the display unit 53 is further configured to: in the case where the topic content comprises a topic classification label, obtain a first topic classification label matched with the target topic; display the first topic classification label in a label display area of the first topic area; and the method further comprises: in response to a triggering operation on the first topic classification label, obtaining a target topic corresponding to the first topic classification label; and jump to a second aggregation page, and display, in the second aggregation page, the target topic corresponding to the first topic classification label.

In a possible implementation, the display unit 53 is further configured to: obtain at least one second topic classification label, each the second topic classification label corresponding to at least one topic group, and each the topic group comprising at least one target topic; display, in a first label area of the book collection page, the at least one second topic classification label, and display, in a second label area of the book collection page, a second topic circle corresponding to at least part of the second topic classification label; and in response to a triggering operation on the second topic circle, jump to display a third aggregation page, and display, in the third aggregation page, at least one target topic comprised in the second topic circle.

In a possible implementation, the display unit 53 is further configured to: in response to a triggering operation on the second topic classification label, obtain at least one sub-classification label comprised in the second topic classification label, and display the at least one sub-classification label, each the sub-classification label corresponding to at least one second topic circle; and in response to a triggering operation on a target sub-classification label among the at least one sub-classification label, obtain a second topic circle corresponding to the target sub-classification label, and display, in the second label area, the second topic circle corresponding to the target sub-classification label.

In a possible implementation, the obtaining unit 52 is further configured to: obtain at least one book classification label of the collected book; determine a preset topic label matched with the at least one book classification label among a plurality of preset topic labels, each the preset topic label comprising a plurality of first candidate topics; and determine the target topic matched with the at least one target book feature of the collected book based on the plurality of first candidate topics to which the matched preset topic label belongs.

In a possible implementation, the obtaining unit 52 is further configured to: obtain a plurality of second candidate topics in a topic circle to which the collected book belongs; determine a second candidate topic matched with at least part of the target book feature among the plurality of second candidate topics; and determine the target topic based on the matched second candidate topic.

For the description of the processing flows of the modules in the apparatus and the interaction flows between the modules, reference may be made to the relevant description in the above method embodiments, so that it will not be described in detail herein.

Figure 6:
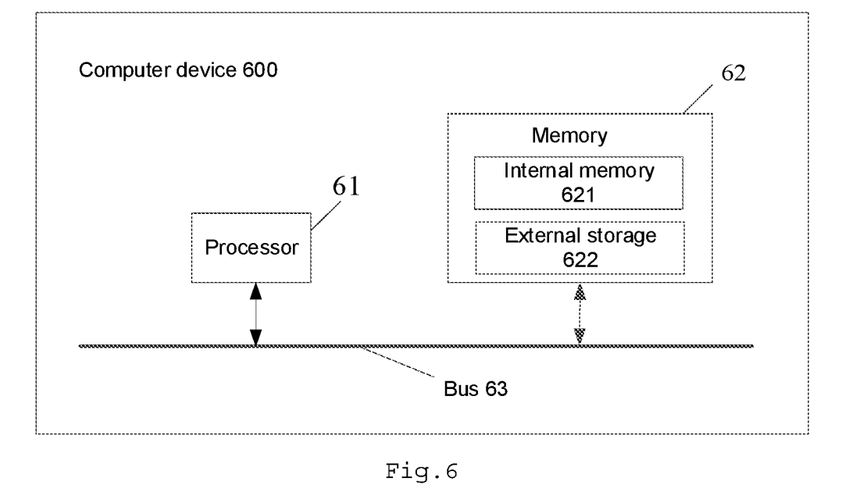
FIG. 6 illustrates a schematic diagram of a computer device according to an embodiment of the present disclosure.

Corresponding to the page display method in FIG. 1, an embodiment of the present disclosure further provides a computer device 600, as shown in FIG. 6, which is a schematic structural diagram of the computer device 600 according to the embodiment of the present disclosure, comprising:

a processor 61, a memory 62, and a bus 63, wherein the memory 62 is used for storing execution instructions and includes an internal memory 621 and an external storage 622; the internal memory 621 here, also called an internal storage, is used for temporarily storing operation data in the processor 61 and data exchanged with the external storage 622 such as a hard disk, the processor 61 performs data exchange with the external storage 622 through the internal memory 621, and when the computer device 600 operates, the processor 61 communicates with the memory 62 through the bus 63, so that the processor 61 executes the following instructions:

responding to a triggering operation on a book collection page;

obtaining a target topic corresponding to a collected book in the book collection page, the target topic being a topic determined among a plurality of candidate topics based on at least one target book feature of the collected book, and the plurality of candidate topics being topics associated with the collected book among posted topics of service modules; and displaying the collected book and the target topic in the book collection page.

An embodiment of the present disclosure further provides a non-transitory computer-readable storage medium having thereon stored a computer program which, when executed by a processor, performs the steps of the page display method in the foregoing method embodiments. The storage medium may be a volatile or non-volatile computer-readable storage medium.

An embodiment of the present disclosure further provides a computer program product having thereon carried program code, instructions included in the program code being usable to execute the steps of the page display method in the foregoing method embodiments, for which reference may be made specifically to the foregoing method embodiments so that the description is not made again herein.

The above computer program product may be specifically implemented by hardware, software or a combination thereof. In an optional embodiment, the computer program product is specifically embodied as a computer storage medium, while in another optional embodiment, the computer program product is specifically embodied as a software product, such as a software development kit (SDK) or the like.

It can be clearly understood by those skilled in the art that, for convenience and simplicity of the description, regarding the specific working processes of the system and the apparatus described above, reference may be made to the corresponding processes in the foregoing method embodiments so that description is not made again herein. In the several embodiments provided in the present disclosure, it should be understood that the disclosed system, apparatus and method may be implemented in other ways. The apparatus embodiment described above is merely illustrative, for example, the division of the units is only a logical functional division, and there may be another division method in an actual implementation, and for another example, a plurality of units or components may be combined or integrated into another system, or some features may be omitted, or not implemented. On the other hand, the shown or discussed coupling or direct coupling or communication connection between each other may be indirect coupling or communication connection through some communication interfaces, devices or units, which may be in an electrical, mechanical or other form.

The units described as separate components may or may not be physically separated, and the components displayed as units may or may not be physical units, that is, they may be located in one position, or may be distributed on a plurality of network units. Some or all of the units can be selected according to actual needs to achieve the purpose of the solution of the embodiment.

In addition, the functional units in the embodiments of the present disclosure may be integrated into one processing unit, or each unit may exist alone physically, or two or more units are integrated into one unit.

The functions, if implemented in a form of a software function unit and sold or used as a stand-alone product, may be stored in one non-volatile computer-readable storage medium executable by a processor. Based on such understanding, the technical solutions of the present disclosure in essence, or the portion contributing to the prior art, or the portion of the technical solution, may be embodied in a form of a software product, and the computer software product is stored in one storage medium and includes several instructions for causing one computer device (which may be a personal computer, a server, a network device, or the like) to execute all or part of the steps of the methods according to the embodiments of the present disclosure. And the above storage medium includes: various media that can store program code, such as a USB flash disk, a mobile hard disk, a read-only memory (ROM), a random access memory (RAM), a magnetic disk, or an optical disk.

Finally, it should be noted that: the above embodiments are merely specific implementations of the present disclosure, which are intended to illustrate the technical solutions of the present disclosure, rather than limiting the technical solutions, so that the protection scope of the present disclosure is not limited thereto, and although the present disclosure is described in detail with reference to the foregoing embodiments, those of ordinary skill in the art should understand that: anyone skilled in the art can, within the technical scope disclosed in the present disclosure, still make modifications or easily thinkable changes to the technical solutions described in the foregoing embodiments, or make equivalent substitutions for partial technical features thereof; and such modifications, changes and substitutions do not make the essence of the corresponding technical solution depart from the spirit and scope of the technical solutions of the embodiments of the present disclosure, and should all be covered within the protection scope of the present disclosure. Therefore, the protection scope of the present disclosure shall be subject to the protection scope of the claims.

What is claimed is:

1. A page display method, comprising:
   responding to a triggering operation on a book collection page;
   obtaining a target topic corresponding to a collected book in the book collection page, the target topic being a topic determined among a plurality of candidate topics based on at least one target book feature of the collected book, and the plurality of candidate topics being topics associated with the collected book among posted topics of service modules; and
   displaying the collected book and the target topic in the book collection page,
   wherein the target topic belongs to at least one first topic circle, and
   the displaying the target topic in the book collection page comprises:
   displaying, in an identification area of the book collection page, a first jump identification for at least part of the first topic circle, the first jump identification being an identification for jumping to a first aggregation page corresponding to the first topic circle, and the first aggregation page comprising a target topic associated with the first topic circle; and
   displaying, in a first topic area of the book collection page, topic content of the target topic, the identification area and the first topic area being different display areas.

2. The method according to claim 1, wherein the target book feature comprises a feature in at least one of: a book updating state dimension, a basic attribute dimension, a book type dimension, a book plot dimension, a book reading information dimension, or a book association event dimension.

3. The method according to claim 1, wherein the topic content comprises a topic classification label, and the displaying, in the first topic area of the book collection page, the topic content of the target topic comprises:
   obtaining a first topic classification label matched with the target topic; and
   displaying the first topic classification label in a label display area of the first topic area; and
   the method further comprises: in response to a triggering operation on the first topic classification label, obtaining a target topic corresponding to the first topic classification label; and jumping to a second aggregation page, and displaying, in the second aggregation page, the target topic corresponding to the first topic classification label.

4. The method according to claim 1, wherein the displaying the target topic in the book collection page comprises:
   obtaining at least one second topic classification label, each the second topic classification label corresponding to at least one topic group, and each the topic group comprising at least one target topic;
   displaying, in a first label area of the book collection page, the at least one second topic classification label, and displaying, in a second label area of the book collection page, a second topic circle corresponding to at least part of the second topic classification label; and
   in response to a triggering operation on the second topic circle, jumping to display a third aggregation page, and displaying, in the third aggregation page, at least one target topic comprised in the second topic circle.

5. The method according to claim 4, wherein the displaying, in the second label area of the book collection page, the second topic circle corresponding to at least part of the second topic classification label comprises:
   in response to a triggering operation on the second topic classification label, obtaining at least one sub-classification label comprised in the second topic classification label, and displaying the at least one sub-classification label, each the sub-classification label corresponding to at least one second topic circle; and in response to a triggering operation on a target sub-classification label among the at least one sub-classification label, obtaining a second topic circle corresponding to the target sub-classification label, and displaying, in the second label area, the second topic circle corresponding to the target sub-classification label.

6. The method according to claim 1, wherein the target topic is determined by:

obtaining at least one book classification label of the collected book;

determining a preset topic label matched with the at least one book classification label among a plurality of preset topic labels, each the preset topic label comprising a plurality of first candidate topics; and determining the target topic matched with the at least one target book feature of the collected book based on the plurality of first candidate topics to which the matched preset topic label belongs.

7. The method according to claim 1, wherein the target topic is determined by:

obtaining a plurality of second candidate topics in a topic circle to which the collected book belongs;

determining a second candidate topic matched with at least part of the target book feature among the plurality of second candidate topics; and determining the target topic based on the matched second candidate topic.

8. A computer device, comprising: a processor, a memory, and a bus, the memory having thereon stored machine-readable instructions executable by the processor, the processor communicating with the memory through the bus when the computer device operates, and the machine-readable instructions, when executed by the processor, performing the steps of:

responding to a triggering operation on a book collection page;

obtaining a target topic corresponding to a collected book in the book collection page, the target topic being a topic determined among a plurality of candidate topics based on at least one target book feature of the collected book, and the plurality of candidate topics being topics associated with the collected book among posted topics of service modules; and displaying the collected book and the target topic in the book collection page, wherein the target topic belongs to at least one first topic circle, and the step of displaying the target topic in the book collection page comprises:

displaying, in an identification area of the book collection page, a first jump identification for at least part of the first topic circle, the first jump identification being an identification for jumping to a first aggregation page corresponding to the first topic circle, and the first aggregation page comprising a target topic associated with the first topic circle; and displaying, in a first topic area of the book collection page, topic content of the target topic, the identification area and the first topic area being different display areas.

9. The computer device according to claim 8, wherein the target book feature comprises a feature in at least one of: a book updating state dimension, a basic attribute dimension, a book type dimension, a book plot dimension, a book reading information dimension, or a book association event dimension.

10. The computer device according to claim 8, wherein the topic content comprises a topic classification label, and the step of displaying, in the first topic area of the book collection page, the topic content of the target topic comprises:

obtaining a first topic classification label matched with the target topic; and displaying the first topic classification label in a label display area of the first topic area; and wherein the machine-readable instructions, when executed by the processor, further performs the steps of: in response to a triggering operation on the first topic classification label, obtaining a target topic corresponding to the first topic classification label; and jumping to a second aggregation page, and displaying, in the second aggregation page, the target topic corresponding to the first topic classification label.

11. The computer device according to claim 8, wherein the step of displaying the target topic in the book collection page comprises:

obtaining at least one second topic classification label, each the second topic classification label corresponding to at least one topic group, and each the topic group comprising at least one target topic;

displaying, in a first label area of the book collection page, the at least one second topic classification label, and displaying, in a second label area of the book collection page, a second topic circle corresponding to at least part of the second topic classification label; and in response to a triggering operation on the second topic circle, jumping to display a third aggregation page, and displaying, in the third aggregation page, at least one target topic comprised in the second topic circle.

12. The computer device according to claim 11, wherein the step of displaying, in the second label area of the book collection page, the second topic circle corresponding to at least part of the second topic classification label comprises:

in response to a triggering operation on the second topic classification label, obtaining at least one sub-classification label comprised in the second topic classification label, and displaying the at least one sub-classification label, each the sub-classification label corresponding to at least one second topic circle; and in response to a triggering operation on a target sub-classification label among the at least one sub-classification label, obtaining a second topic circle corresponding to the target sub-classification label, and displaying, in the second label area, the second topic circle corresponding to the target sub-classification label.

13. The computer device according to claim 8, wherein the target topic is determined by:

obtaining at least one book classification label of the collected book;

determining a preset topic label matched with the at least one book classification label among a plurality of preset topic labels, each the preset topic label comprising a plurality of first candidate topics; and determining the target topic matched with the at least one target book feature of the collected book based on the plurality of first candidate topics to which the matched preset topic label belongs.

14. The computer device according to claim 8, wherein the target topic is determined by:

obtaining a plurality of second candidate topics in a topic circle to which the collected book belongs;

determining a second candidate topic matched with at least part of the target book feature among the plurality of second candidate topics; and determining the target topic based on the matched second candidate topic.

15. A non-transitory computer-readable storage medium, wherein the non-transitory computer-readable storage medium having thereon stored a computer program which, when executed by a processor, performs the steps of:

responding to a triggering operation on a book collection page;

obtaining a target topic corresponding to a collected book in the book collection page, the target topic being a topic determined among a plurality of candidate topics based on at least one target book feature of the collected book, and the plurality of candidate topics being topics associated with the collected book among posted topics of service modules; and displaying the collected book and the target topic in the book collection page, wherein the target topic belongs to at least one first topic circle, and the step of displaying the target topic in the book collection page comprises:

displaying, in an identification area of the book collection page, a first jump identification for at least part of the first topic circle, the first jump identification being an identification for jumping to a first aggregation page corresponding to the first topic circle, and the first aggregation page comprising a target topic associated with the first topic circle; and displaying, in a first topic area of the book collection page, topic content of the target topic, the identification area and the first topic area being different display areas.

16. The non-transitory computer-readable storage medium according to claim 15, wherein the target book feature comprises a feature in at least one of: a book updating state dimension, a basic attribute dimension, a book type dimension, a book plot dimension, a book reading information dimension, or a book association event dimension.

17. The non-transitory computer-readable storage medium according to claim 15, wherein the topic content comprises a topic classification label, and the step of displaying, in the first topic area of the book collection page, the topic content of the target topic comprises:

obtaining a first topic classification label matched with the target topic; and displaying the first topic classification label in a label display area of the first topic area; and wherein the computer program, when executed by the processor, further performs the steps of: in response to a triggering operation on the first topic classification label, obtaining a target topic corresponding to the first topic classification label; and jumping to a second aggregation page, and displaying, in the second aggregation page, the target topic corresponding to the first topic classification label.

* * * * *